(12) United States Patent
Aurich et al.

(10) Patent No.: US 8,589,664 B2
(45) Date of Patent: Nov. 19, 2013

(54) PROGRAM FLOW CONTROL

(75) Inventors: Merlijn Aurich, Heverlee (BE); Jef Verdonck, Beriaar (BE)

(73) Assignee: u-blox AG, Thalwil (CH)

( * ) Notice: Subject to any disclaimer, the term of this patent is extended or adjusted under 35 U.S.C. 154(b) by 520 days.

(21) Appl. No.: 12/923,155

(22) Filed: Sep. 7, 2010

(65) Prior Publication Data

US 2011/0093683 A1  Apr. 21, 2011

(30) Foreign Application Priority Data

Oct. 19, 2009 (GB) .................................. 0918297.3

(51) Int. Cl.
  *G06F 9/30* (2006.01)
(52) U.S. Cl.
  USPC .......................................... 712/220; 712/226
(58) Field of Classification Search
  None
  See application file for complete search history.

(56) References Cited

U.S. PATENT DOCUMENTS

| 5,293,620 A * | 3/1994 | Barabash et al. ............. 718/102 |
| 5,481,747 A * | 1/1996 | Kametani ...................... 718/102 |
| 5,499,349 A * | 3/1996 | Nikhil et al. ..................... 712/26 |
| 5,710,913 A | 1/1998 | Gupta et al. |
| 6,055,579 A * | 4/2000 | Goyal et al. ................... 713/375 |
| 7,321,965 B2 * | 1/2008 | Kissell .......................... 712/229 |
| 7,594,089 B2 * | 9/2009 | Vishin et al. .................. 711/168 |
| 2005/0216779 A1 | 9/2005 | Ferrand et al. |
| 2006/0059484 A1 * | 3/2006 | Selvaggi et al. .............. 718/100 |
| 2009/0048804 A1 * | 2/2009 | Gary ............................. 702/176 |

FOREIGN PATENT DOCUMENTS

EP  1 267 255  5/2003

OTHER PUBLICATIONS

Search Report for UK 0918297.3, dated Feb. 3, 2010.

* cited by examiner

*Primary Examiner* — Eric Coleman
(74) *Attorney, Agent, or Firm* — Nixon & Vanderhye P.C.

(57) ABSTRACT

A data processing apparatus includes a data engine 6 having an instruction decoder 18 for generating one or more control signals 24 for controlling processing circuitry 20 to perform data processing operations specified by the program instructions decoded. The instruction decoder 18 responsive to a marker instruction to read a programmable flow control value from a flow control register 38. The programmable flow control value specifies the action to be taken upon completion of execution of a current sequence of program instructions. The action taken may be jumping to a target program instruction at the start of a target sequence of program instructions or entry into an idle state awaiting a new processing task to be initiated.

14 Claims, 5 Drawing Sheets

PROGRAM FLOW CONTROL

BACKGROUND OF THE INVENTION

This application claims priority to GB Application No. 0918297.3 filed Oct. 19, 2009, the entire contents of which are incorporated herein by reference.

1. Field of the Invention

This invention relates to the field of data processing systems. More particularly, this invention relates to the control of program flow within data processing systems.

2. Description of the Prior Art

It is known to provide data processing systems with instruction decoder circuitry responsive to program instructions to generate one or more control signals for controlling processing circuitry to perform data processing operations specified by the program instructions. A convenient way of organising programs is to divide them into routines or functions which can be called as required. As an example, code may be written and compiled to perform a function, such as the calculation of a Fourier transform upon a set of data values. This function may be called from a number of different points within the program flow. It is also possible that in a system including more than one set of hardware for executing program instructions, one set of hardware may execute one set of instructions while another set of hardware executes another set of instructions. Within this environment, one set of hardware may invoke a function, such as a Fourier transform, to be executed by another set of hardware. Within such an environment, it is possible to form specialised hardware for executing particular functions.

An example of special purpose hardware for executing particular functions is a data engine. Data engines may be provided to perform computationally intensive tasks, such as, for example, media processing. Data engines typically include special purpose hardware designed to efficiently execute the tasks associated with the data engine. Such a data engine may operate in conjunction with a general purpose processor which schedules tasks to be executed by the data engine. In some instances, it is possible for the data engine itself to schedule its own tasks for execution by the data engine using a scheduling program executing upon the data engine.

The development and testing of programs to execute particular functions is expensive and time consuming. It is desirable that programs should require a low amount of memory storage.

SUMMARY OF THE INVENTION

Viewed from one aspect the present invention provides apparatus for processing data comprising:

instruction decoder circuitry responsive to a program instruction to generate one or more control signals;

processing circuitry responsive to said one or more control signals to perform a data processing operation specified by said program instruction; and a flow control register configured to store a programmable flow control value; wherein said instruction decoder is responsive to a marker instruction indicative of an end of a current sequence of program instructions being executed to read said programmable flow control value from said flow control register and in dependence upon said programmable flow control value generate said one or more control signals to trigger after completion of said current sequence of program instructions one of:

(i) processing of a target sequence of program instructions starting from a target program instruction; and (ii) entry to an idle state awaiting a new processing task to be initiated.

The present technique recognises that a current sequence of program instructions being executed may have been invoked via different mechanisms with different behaviour being appropriate at completion of the execution of the current sequence of program instructions depending upon how it was invoked. Instead of providing different versions of the current sequence of program instructions depending upon how they are invoked, the present technique uses a program flow control value stored within a flow control register to determine what behaviour should occur when the current sequence of program instructions completes execution. Thus, the current sequence of program instructions need not be modified or provided in different forms and yet may support the triggering of different behaviour at completion. More particularly, the different behaviours it is desired to support at completion are triggering the processing of a target sequence of program instructions starting from a target program instruction or entry to an idle state, e.g. awaiting a new processing task to be initiated. These behaviours support systems in which the current sequence of program instructions is invoked from a target scheduling program executing upon the same mechanism that executes the current sequence of program instructions as well as supporting a mechanism in which the current sequence of program instructions is invoked from a mechanism separate from that executing the current sequence of program instructions such that when the current sequence of program instructions completes then an idle state should be entered.

The target program instruction which is executed for some values of the programmable flow control value may be a fixed target program instruction at a fixed position (e.g. a hardwired vector). However, greater flexibility is achieved when the programmable flow control value specifies a memory address of the program instruction. Thus, the target program instruction can be varied depending upon the value set for the programmable flow control value.

The programmable flow control value may include a jump enable field storing a value specifying whether the programmable flow control value includes a target address field specifying the memory address of a target program instruction or alternatively, that the idle state should be entered when execution of the current sequence of program instructions has completed. This jump enable field, which may be a jump enable bit, serves to switch between the alternative behaviours at completion of the current sequence of program instructions.

The marker instruction to which the instruction decoder responds to trigger the alternative end-of-routine behaviours may be an end of program instruction identifying a last program instruction of the current sequence of program instructions. This end of program instruction may be the last instruction within the sequence or may be located a predetermined number of instructions in front of the last instruction of the current sequence of program instructions. The latter behaviour is useful when the current sequence of program instructions is executed on a pipelined execution mechanism so as to facilitate efficient use of the pipeline by ensuring that if a branch to the target sequence of program instructions is required, then this may be identified in sufficient time ahead of the final instruction of the current sequence of program instructions that the target program instruction may be fetched to start follow-on execution.

The target sequence of program instructions of which execution may be triggered in one behaviour can take a variety of different forms. As an example, it would be possible to chain together multiple functions with the end of one function serving to trigger the start of the next function. An alternative mechanism is that the target sequence of program instructions is a target scheduling program for controlling task scheduling and executed by the same mechanism which is executing the current sequence of program instructions, i.e. the mechanism uses the target scheduling program to schedule its own tasks.

The apparatus utilising the above techniques may have a variety of different forms and is applicable to a variety of different multi-processing environments. However, one environment to which the technique is well suited is when the apparatus comprises a host processor coupled to a data engine and the instruction decoder circuitry, the processing circuitry and the flow control register are part of the data engine.

Within this environment, the target scheduling program may be executed by the data engine and the current sequence of program instructions may be invoked either by the host processor or the target scheduling program. The use of the flow control register to control the behaviour at completion of the current sequence of program instructions enables the same current sequence of program instructions to be used independently of how it is invoked and how it is appropriate to behave at completion of that current sequence of program instructions.

The host processor may also utilise a host scheduling program to invoke the current sequence of program instructions for execution by the data engine.

In some embodiments, the flow control value may be programmed such that when the target scheduling program invokes the current sequence of program instructions, then a return to execution of the target scheduling program is triggered after completion of the current sequence of program instructions and when the post scheduling program invokes the current sequence of program instructions, then the data engine is triggered to enter an idle state after completion of the current sequence of program instructions.

The programmable flow control value may be loaded in response to a load program instruction decoded and executed within the data engine.

The load program instructions can have one form in which the jump enable field is forced to a value specifying that the programmable flow control value includes a target address field specifying the memory address of the target program instruction which is to be triggered for execution upon completion of the current sequence of program instructions as well as a second form in which the jump enable field may be set to a value giving either the behaviour described above or forcing entry to the idle state when execution of the current sequence of program instructions has completed. The first form need not be present.

Viewed from another aspect the present invention provides apparatus for processing data comprising:

instruction decoder means circuitry responsive to a program instruction for generating one or more control signals;

processing means responsive to said one or more control signals for performing a data processing operation specified by said program instruction; and flow control register means for storing a programmable flow control value; wherein said instruction decoder means is responsive to a marker instruction indicative of an end of a current sequence of program instructions being executed to read said programmable flow control value from said flow control register means and in dependence upon said programmable flow control value generate said one or more control signals to trigger after completion of said current sequence of program instructions one of:

(i) processing of a target sequence of program instructions starting from a target program instruction; and (ii) entry to an idle state awaiting a new processing task to be initiated.

Viewed from a further aspect the present invention provides a method of processing data comprising the steps of:

response to a program instruction, generating one or more control signals;

in response to said one or more control signals, performing a data processing operation specified by said program instruction; and storing a programmable flow control value; wherein in response to a marker instruction indicative of an end of a current sequence of program instructions being executed, reading said programmable flow control value and, in dependence upon said programmable flow control value, generating said one or more control signals to trigger after completion of said current sequence of program instructions one of:

(i) processing of a target sequence of program instructions starting from a target program instruction; and (ii) entry to an idle state awaiting a new processing task to be initiated.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
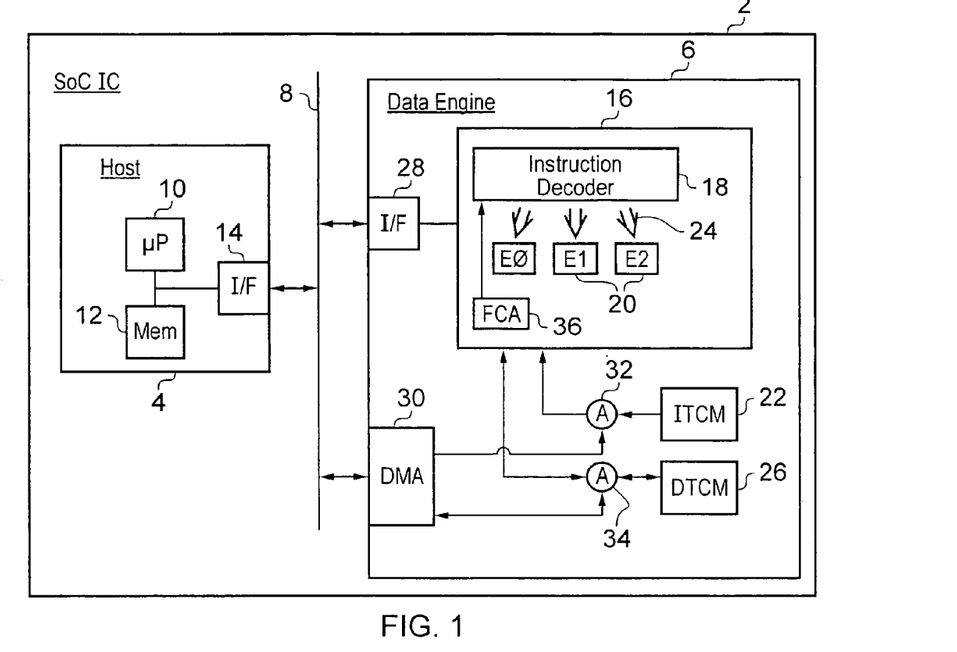
FIG. 1 schematically illustrates a system-on-chip integrated circuit including a host processor and a data engine.

FIG. 1 schematically illustrates a system-on-chip integrated circuit 2 including a host processor 4 and a data engine 6 connected via a system bus 8. The host processor 4 includes a processor core 10, a host memory 12 and a system interface 14. The data engine 6 includes a processing core 16 including an instruction decoder 18 and processing circuitry 20. An instruction tightly coupled memory 22 stores sequences of program instructions for decoding by the instruction decoder 18 to generate control signals 24 that control the processing circuitry 20. A data tightly coupled memory 26 stores input and output data values manipulated by the processing circuitry 20 under control of the program instructions from the instruction tightly coupled memory 22 as decoded by the instruction decoder 18. A system interface 28 couples the data engine 6 to the system bus 8. A direct memory access unit 30 permits the host processor 4 to read data values from and write data values to the instruction tightly coupled memory 22 and the data tightly coupled memory 26 via arbiters 32 and 34.

In operation the host processor 4 will typically perform control and other high level processing functions as directed by program instructions stored within the host memory 12. The program instructions stored within the host memory 12 may include a host scheduling program which serves to invoke processing operations on the data engine 6. The data engine 6 typically performs lower level computationally intensive processing operations, such as media processing, compression, decryption etc.

Normal operation of a function (current sequence of program instructions) invoked for execution upon the data engine 6 is that this current sequence of program instructions will execute until an end of program (EOP) instruction (marker instruction) is encountered at its end, whereupon the data engine 6 will enter an idle state awaiting the next task to be invoked thereupon. It is also possible that the data engine 6 may include its own scheduling mechanism in the form of a target scheduling program stored within the instruction tightly coupled memory 22. This target scheduling program may invoke functions to be executed upon the data engine 6, thus permitting the data engine to "self-schedule". At the end of executing a function invoked upon the data engine 6 by the target scheduling program executed by the data engine 6 itself, program flow can return to that target scheduling program, or at least to another program (e.g. a chained function), rather than the data engine 6 entering an idle state as was the case for a function invoked from the host processor 4.

The current sequence of program instructions which performs the function invoked may be a common sequence of programming instructions taken from a library which is shared for functions which are both invoked from the host processor 4 and from the data engine 6. This is to avoid having to provide separate forms of the current sequence of program instructions (library function) to be used in dependence upon which of the host processor 4 and the data engine 6 is invoking execution thereof. This saves coding effort and program storage resources. Nevertheless, it is necessary for different actions to be triggered upon completion of the invoked functions. This different behaviour is controlled using a flow control register 36 within the data engine 6.

The flow control register 36 stores a programmable flow control value which is read by the instruction decoder 18 when an end of program instruction (marker instruction) is encountered within the current sequence of program instructions being executed. The programmable flow control value specifies which type of behaviour is to be triggered when the current sequence of program instructions completes execution. One type of behaviour that is triggered places the data engine 6 into an idle state (low power state) when execution is completed. A different value of the programmable flow control value serves to trigger a jump to a target program instruction specified by a target address within the programmable flow control value upon completion of execution of the current sequence of program instructions. This target address and the target program instruction may be within a target scheduling program of the data engine 6 when the data engine 6 is "self-scheduling". Thus, control is returned to the target scheduling program upon completion of the current sequence of program instructions. It is also possible that the programmable program control value may store an address corresponding to a jump to another function which is chained with the current sequence of program instructions.

Figure 2:
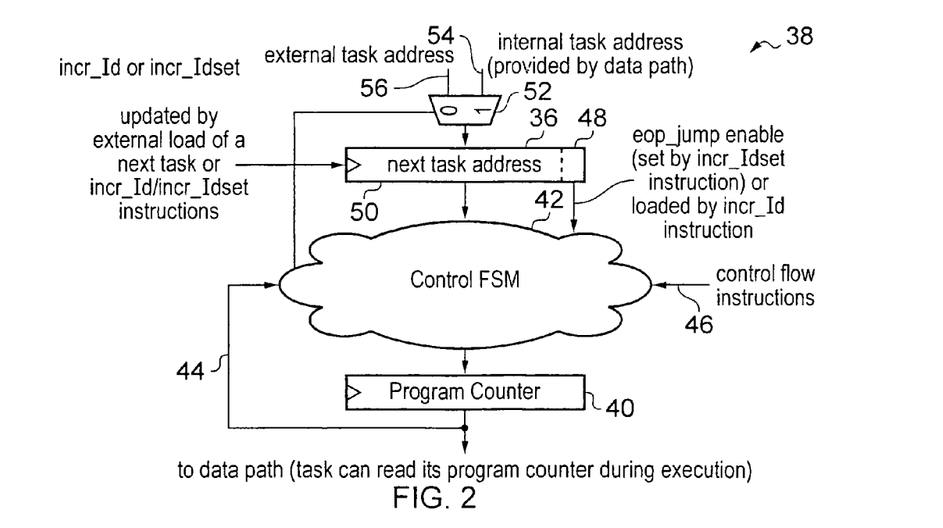
FIG. 2 schematically illustrates a program flow control mechanism for use within the data engine of FIG. 1.

FIG. 2 schematically illustrates a program flow control mechanism 38 within the data engine 6. A program counter register 40 stores a memory address within the instruction tightly coupled memory 22 from which a next instruction to be decoded by the instruction decoder 18 is fetched. The instruction decoder 18 generates control signals (one or more control signals) 24 for controlling program flow from the decoded program instruction. Other control signals generated by decoders in parallel processing elements (e.g. ALU, AGU, etc) serve to control the processing circuitry 20 to perform data processing operations corresponding to the program instruction decoded. The processing operations may be simple, such as loads, stores, shifts, etc., or more complicated operations such as multiplications, multiply-accumulate operations, filter operations, etc. depending upon the nature of the processing required of the data engine 6.

The program counter register 40 is loaded with a program counter value by a control flow state machine 42. The control flow state machine 42 can load the program counter register 40 with a program counter value taken from a variety of different sources. When the current sequence of program instructions is being sequentially executed, then a feedback path 44 and an incrementing circuit within the control flow state machine 42 serve to steadily increment the program counter value and step through the current sequence of program instructions being executed. When control flow instructions are decoded by the instruction decoder 18 within the current sequence of program instructions (e.g. branch instructions), then the target addresses of those control flow instructions are supplied to the control flow state machine 42 via a control flow instruction path 46 and loaded into the program counter register 40 so as to perform the jump in execution point.

The flow control register 36 also provides an input to the control flow state machine 42. The flow control register 36 stores a programmable flow control value formed of a jump enable flag 48 and a next task address 50. When an end of program (EOP) instruction is encountered within the current sequence of program instructions, this may be signalled to the control flow state machine 42 by signals on the control flow instruction path 46. An end of program instruction controls the control flow state machine 42 to read the programmable flow control value from the flow control register 36. If the jump enable bit 48 is not set, then the control flow state machine 42 will trigger the data engine 6 to enter an idle state upon completion of the current sequence of program instructions (e.g. a predetermined fixed number of processing cycles following the decoding of the end of program instruction). This behaviour corresponds to the requirement when the host processor 4 has invoked the execution of the current sequence of program instructions.

If the jump enable flag 48 is set, then the control flow state machine 42 will read the next task address 50 (memory address of the target program instruction within the instruction tightly coupled memory 22) upon encountering the end of program instruction and triggers the memory address of the target program instruction to be loaded into the program counter register 40 (with a delay matched to the pipeline depth), such that the target program instruction will be fetched and executed upon completion of the current sequence of program instructions.

In this example, the jump enable flag 48 is a single bit. More generally, the jump enable flag may be considered to be a jump enable field, which may comprise one or more bits.

The flow control register 36 is loaded with the programmable flow control value 48, 50 by a load instruction which then can have two different forms. In the first form incr_ldset the jump flag 48 is forced to a set value ("1") and the memory of the target program instruction is loaded into the next task address 50 portion of the programmable flow control value 36. The second form of load instruction incr_ld acts in a similar way except that the jump enable flag is not forced to a set value and instead may be specified as either set or not set. These programmable flow control values loaded into the flow control register 36 in response to the load instructions are supplied to the flow control register 36 via the multiplexer 52 and an internal data path 54 from within the data engine 6 which executes the load instruction. When processing is invoked by the host processor 4, then the programmable flow control value within the flow control register 36 may be loaded via the multiplexer 52 and an external task address path 56 whereby a programmable flow control value set by the host processor 44 is loaded into the flow control mechanism 38 of the data engine 6.

Figure 3:
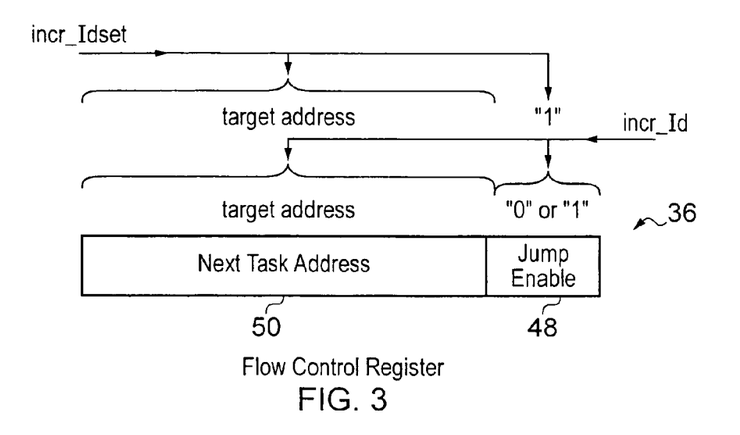
FIG. 3 schematically illustrates a flow control register storing a programmable flow control value.

FIG. 3 schematically illustrates the flow control register 36. The flow control register 36 stores the next task address 50 and the jump enable flag 48. The first form of load instruction incr_ldset loads the target address into the next task address field 50 and forces the jump enable flag 48 to a value of "1" forcing a jump of program flow within the data engine 6 upon completion of the current sequence of program instructions. The second form of load instruction incr_ld also loads the target address into the next task address field 50, but in this case enables either a set value or an unset value to be loaded into the jump enable flag 48.

Figure 4:
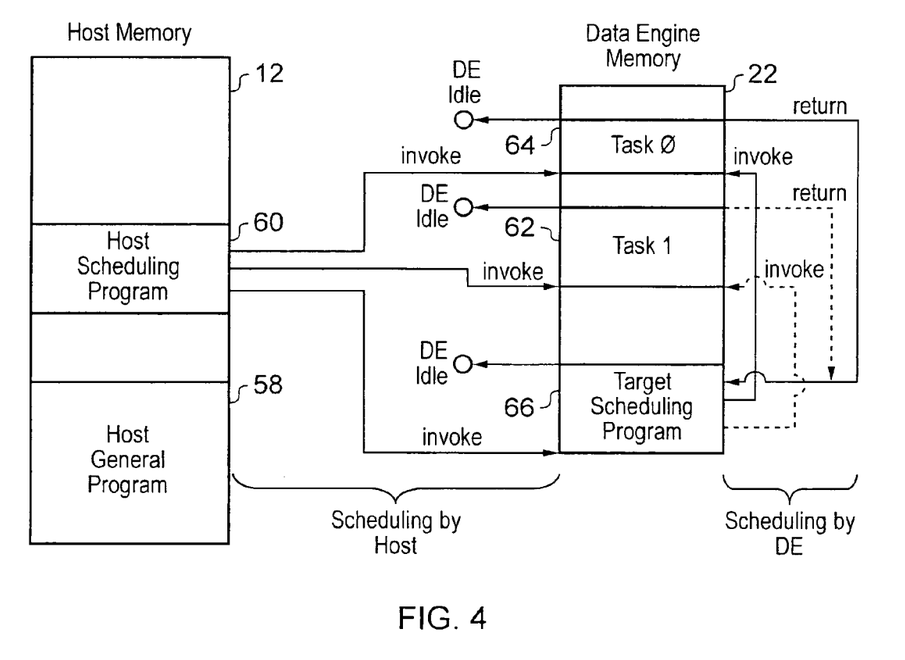
FIG. 4 schematically illustrates a host processor memory and a data engine memory storing respective program instructions.

FIG. 4 schematically illustrates the programs stored within the host memory 12 and the instruction tightly coupled memory 22. The host memory 12 may store a host general program 58 for performing data processing operations unrelated to the action of invoking functions upon the data engine 6. The host memory 12 also stores a host scheduling program 60 which serves to schedule functions for execution by the data engine 6.

The functions scheduled for execution by the data engine 6 correspond to sequences of program instructions 62, 64 stored within the instruction tightly coupled memory 22. These sequences of program instructions 62, 64 each correspond to a current sequence of program instructions as referred to above when they are executing and prior to their completion. The instruction tightly coupled memory 22 will typically store many of these functions in the form of a function library, each corresponding to a sequence of program instructions for controlling the data engine 6 to execute processing operations corresponding to the desired function. Also stored within the instruction tightly coupled memory 22 is a target scheduling program 66 which may be used by the data engine 6 for "self-scheduling" when the sequences of program instructions executed by the data engine 6 are invoked by the data engine 6 itself.

On the left hand side of FIG. 4 the invocation of the respective sequences of program instruction 62, 64 are illustrated when it is the host scheduling program 60 executed by the host processor 4 which is invoking execution. When the sequences of program instructions invoked in this way complete, then the data instruction is placed into an idle state as illustrated by the line linking to the point "DE Idle". The target scheduling program 66 executed by the data engine 6 is also invoked from the host scheduling program 60 when it is initiated. Thereafter, the target scheduling program 66 serves to schedule sequences of program instructions 62, 64 for execution by the data engine 6 on a "self-scheduling" basis until the target scheduling program 66 itself completes.

The sequences of program instructions 62, 64 that are invoked may be in the form of intrinsics provided within a library of intrinsics. Such intrinsics are typically invoked using call instructions with an operand that is a pointer to the desired intrinsic, e.g. call[intrinsic0_pointer].

On the right hand side of the illustrated instruction tightly coupled memory 22 are shown lines indicating the invoking of the different sequences of program instructions 62, 64 by the target scheduling program executed upon the data engine 6. When each of these sequences of program instruction 62, 64 completes, a return of program execution point is made into the target scheduling program 66 so that this may continue its scheduling operation.

Figure 5:
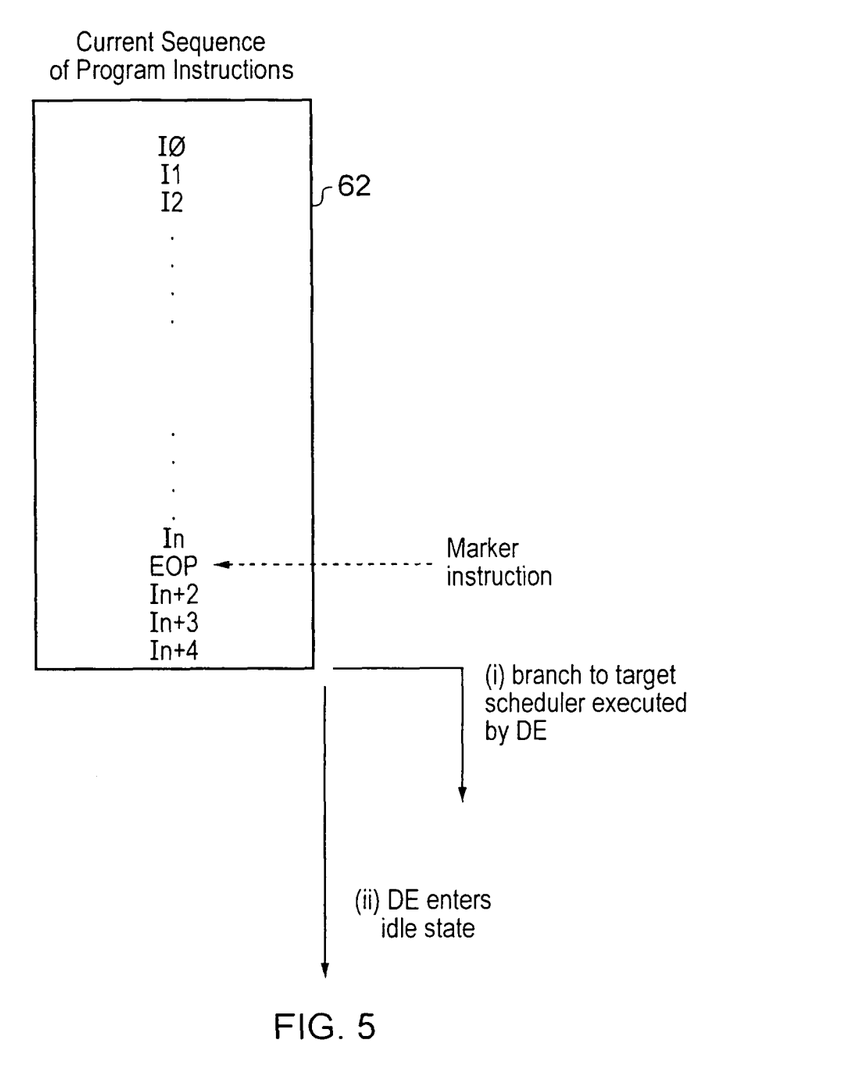
FIG. 5 schematically illustrates a current sequence of program instructions executed by the data engine and including a marker instruction in the form of an end of program instruction.

FIG. 5 schematically illustrates a current sequence of program instructions 62 which is executed. This current sequence of program instructions includes instructions I0, I1, etc. which are executed in turn by the data engine 6. More particularly, the instruction decoder 18 decodes these instructions I0, I1, etc. and generates one or more corresponding control signals 24 which control the processing circuitry 20 to perform the specified processing operations. A predetermined number of instructions from the last instruction within the current sequence of program instruction 62 there is located a marker instruction in the form of an end of program instruction EOP. This end of program instruction indicates that after the next three program instructions $I_n+2$, $I_n+3$ and $I_n+4$ have been executed, the data engine 6 may, for example, trigger one of two types of further action. The first type of action is to branch to execute the target scheduling program 66 with execution thus continuing within the data engine 6. The programmable flow control value read from the flow control register 36 specifies the address of the target program instruction to be jumped to within the target scheduling program 66. The second course of action which may be triggered is that the data engine enters an idle state. This idle state entry occurs when the jump enable bit 48 within the programmable flow control value is not set.

Figure 6:
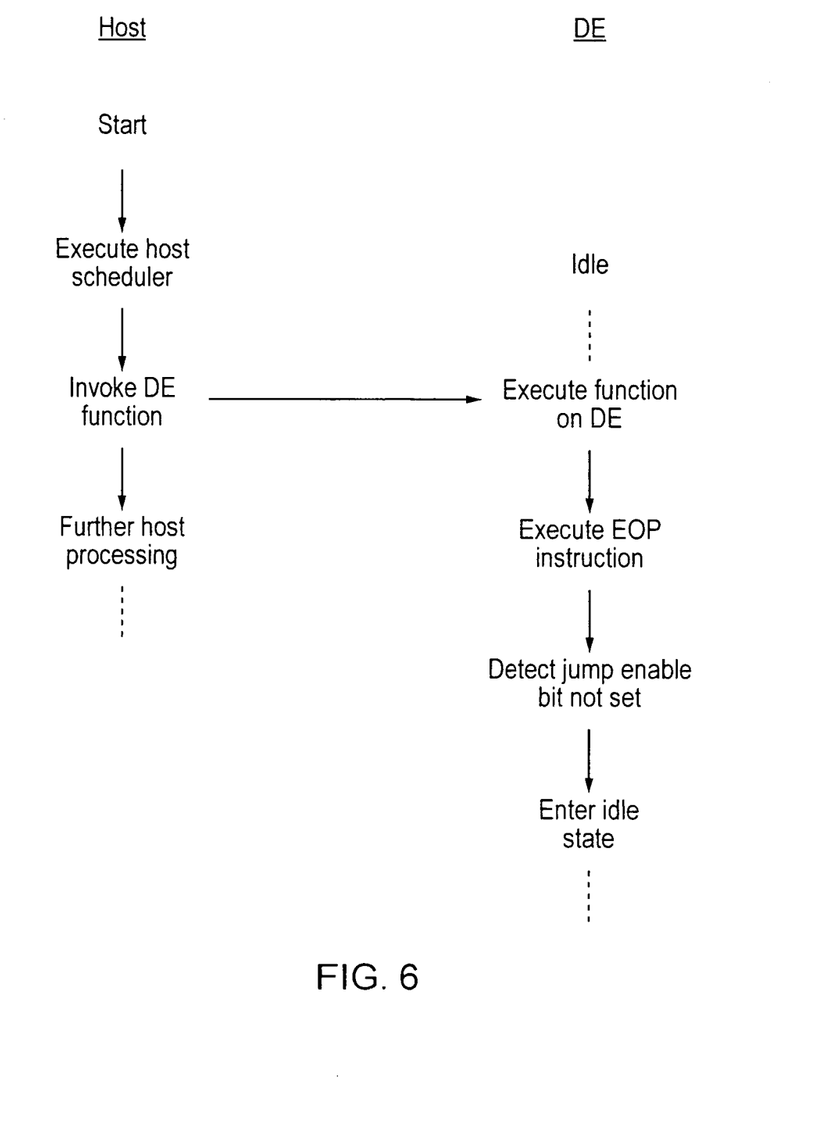
FIG. 6 schematically illustrates operation flow when a host processor invokes execution of a function in the data engine.

FIG. 6 illustrates the invoking of a function to be executed upon the data engine 6 by the host processor 4. The host processor 4 executes the host scheduling program 60. This host scheduling program 60 then invokes a data engine function and initiates processing by the data engine 6. This invoking of processing may be achieved by loading a next task address value into the flow control register 36 via the multiplexer 52 and the external task address path illustrated in FIG. 2. Thus, the data engine 6 is handed the start address of the current sequence of program instructions to be invoked. Having invoked the required processing upon the data engine 6, the host processor 4 continues further host processing and may or may not be controlled (programmed) to operate in a manner responsive to the completion of the invoked task by the data engine 6.

On the data engine side of FIG. 6, the data engine 6 is idle until the function invoked by the host processor 4 is initiated. The data engine 6 then executes the invoked function. Toward the end of the current sequence of program instructions corresponding to the invoked function, an end of program instruction is encountered and executed. The execution of the end of program instruction results in a detection of whether or not the jump enable bit 48 is set within the programmable flow control value stored within the flow control register 36. As the function being executed by the data engine 6 was invoked by the host processor 4, it is expected that the data engine 6 will enter its idle state following completion of execution of the function and the jump enable bit 48 will not be set. Accordingly, following the attempted detected of the jump enable bit, this will be determined as not set and the data engine 6 will enter the idle state.

Figure 7:
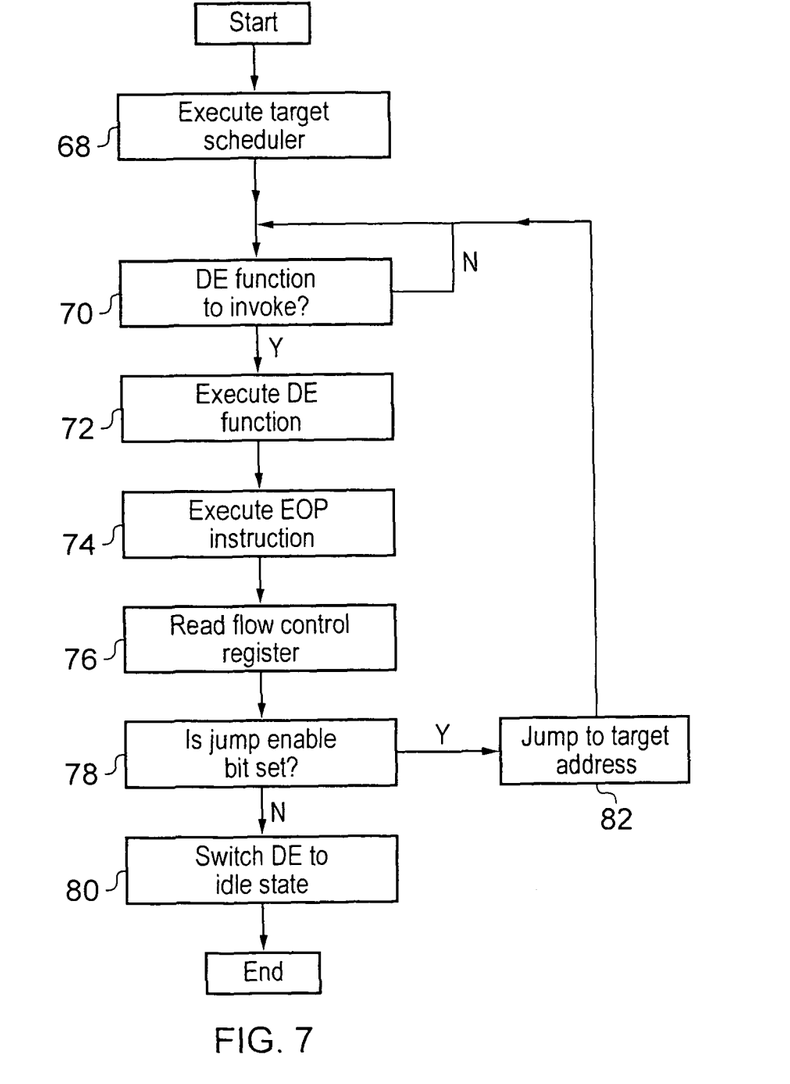
FIG. 7 is a flow diagram schematically illustrating function scheduling by a target scheduler executing on the data engine.

FIG. 7 is a flow diagram schematically illustrating scheduling of the execution of sequences of program instructions 62, 64 by the target scheduling program 66 executed by the data engine 6 itself. At step 68 execution of the target scheduling program 66 is initiated. The execution of the target scheduling program 66 may itself be invoked by the host scheduling program 60, as is illustrate in FIG. 4.

At step 70 the target scheduling program 66 waits until there is a data engine function to invoke. When a data engine function is ready to be invoked, then step 72 commences execution of the data engine function (current sequence of program instructions) concerned. Toward the end of this data engine function, an end of program instruction will be executed at step 74. The execution of the end of program instruction triggers a read of the programmable flow control value from the flow control register 36 at step 76. Step 78 determines whether the jump enable bit 48 is set. If the jump enable bit is not set, then step 80 switches the data engine to an idle state. The target scheduler 68 can perform a load to the flow control value 36 with a value of the jump enable bit 48 set to "0", such that upon completion of the next sequence of program instructions 62, 64 the data engine 6 will enter an idle state. However, if the target scheduling program 66 is to remain active and regain control following completion of a current sequence of program instructions 66, 64, then the jump enable bit will be set and after the determination at step 78, processing will proceed to step 82 at which a jump to the target address specified within the next task address field 58 will be performed. In the example illustrated, this jump is back to the target scheduling program 66 and step 70 where the target scheduling program 66 waits for the next data engine function to invoke. It is also possible that functions may be chained together and the jump performed at step 82 may be to the start of another function.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   instruction decoder circuitry, responsive to a program instruction, configured to generate one or more control signals;
   processing circuitry, responsive to said one or more control signals, configured to perform a data processing operation specified by said program instruction; and
   a flow control register configured to store a programmable flow control value; wherein
   said instruction decoder circuitry, responsive to a marker instruction indicative of an end of a current sequence of program instructions being executed, is configured to read said programmable flow control value from said flow control register and, in dependence upon said programmable flow control value, to generate said one or more control signals to select among and to trigger, after completion of said current sequence of program instructions, a selected one of:
   (i) processing of a target sequence of program instructions starting from a target program instruction; and
   (ii) entry to an idle state of said processing circuitry awaiting a new processing task to be initiated.

2. Apparatus as claimed in claim 1, wherein said programmable flow control value specifies a memory address of said target program instruction.

3. Apparatus as claimed in claim 1, wherein said programmable flow control value includes a jump enable field storing a value specifying that one of:
   (i) said programmable flow control value includes a target address field specifying said memory address of said target program instruction; and
   (ii) said idle state is entered when execution of said current sequence of program instructions has completed.

4. Apparatus as claimed in claim 3, wherein said jump enable field is a jump enable bit.

5. Apparatus as claimed in claim 1, wherein said marker instruction is an end of program instruction identifying a last program instruction of said current sequence of program instructions.

6. Apparatus as claimed in claim 1, wherein said target sequence of program instructions is a target scheduling program for controlling task scheduling.

7. Apparatus as claimed in claim 1, wherein said apparatus comprises a host processor coupled to a data engine and said instruction decoder circuitry, said processing circuitry and said flow control register are part of said data engine.

8. Apparatus as claimed in claim 6, wherein said target scheduling program is executed by said data engine and said current sequence of program instructions is invoked for execution by one of said host processor and said target scheduling program.

9. Apparatus as claimed in claim 8, wherein said host processor invokes said current sequence of program instructions using a host scheduling program executed by said host processor.

10. Apparatus as claimed in claim 9, wherein:
    (i) when said target scheduling program invokes said current sequence of program instructions, said programmable flow control value is programmed to a value to trigger a return to execution of said target scheduling program after completion of said current sequence of program instructions: and
    (ii) when said host scheduling program invokes said current sequence of program instructions, said programmable flow control value is programmed to a value to trigger said data engine to enter said idle state after completion of said current sequence of program instructions.

11. Apparatus as claimed in claim 7, wherein said programmable flow control value is stored in said flow control register in response to a load program instruction decoded with said data engine by said instruction decoder circuitry.

12. Apparatus as claimed in claim 3, wherein said instruction decoder circuitry is responsive to:
    (i) a first form of said load program instruction in which said jump enable field is forced to a value specifying that said programmable flow control value includes a target address field specifying said memory address of said target program instruction; and
    (ii) a second form of said load program instruction in which said jump enable field is one of a value specifying that said programmable flow control value includes a target address field specifying said memory address of said target program instruction and a value specifying that said idle state is entered when execution of said current sequence of program instructions has completed.

13. Apparatus for processing data comprising:
    instruction decoder means, responsive to a program instruction, for generating one or more control signals;

processing means, responsive to said one or more control signals, for performing a data processing operation specified by said program instruction; and flow control register means for storing a programmable flow control value; wherein said instruction decoder means, responsive to a marker instruction indicative of an end of a current sequence of program instructions being executed, for reading said programmable flow control value from said flow control register means and, in dependence upon said programmable flow control value, for generating said one or more control signals for selecting among and for triggering, after completion of said current sequence of program instructions, a selected one of:

(i) processing of a target sequence of program instructions starting from a target program instruction; and (ii) entry to an idle state of said processing means awaiting a new processing task to be initiated.

14. A method of processing data on a data processing apparatus, said method comprising the steps of:

in response to a program instruction, generating one or more control signals;

in response to said one or more control signals, performing a data processing operation specified by said program instruction; and storing a programmable flow control value; wherein in response to a marker instruction indicative of an end of a current sequence of program instructions being executed, reading said programmable flow control value and, in dependence upon said programmable flow control value, generating said one or more control signals to select among and to trigger, after completion of said current sequence of program instructions, a selected one of:

(i) processing of a target sequence of program instructions starting from a target program instruction; and (ii) entry to an idle state of said processing apparatus awaiting a new processing task to be initiated.

* * * * *